United States Patent [19]
Zaitsu et al.

[11] Patent Number: 5,231,551
[45] Date of Patent: Jul. 27, 1993

[54] CASSETTE LOADING DEVICE FOR A MAGNETIC RECORDING/REPRODUCING APPARATUS

[75] Inventors: Osamu Zaitsu, Neyagawa; Makoto Okuda, Hirakata, both of Japan

[73] Assignee: Matsushita Electric Industrial Co., Ltd., Osaka, Japan

[21] Appl. No.: 715,591

[22] Filed: Jun. 14, 1991

[30] Foreign Application Priority Data

Jun. 19, 1990 [JP] Japan .................. 2-158835

[51] Int. Cl.⁵ .......................... G11B 15/665
[52] U.S. Cl. ................................ 360/85
[58] Field of Search ............. 360/85, 95, 96.5, 96.6

[56] References Cited
U.S. PATENT DOCUMENTS 4,641,210 2/1987 Ohyama ................... 360/96.5

FOREIGN PATENT DOCUMENTS

0127447 12/1984 European Pat. Off. .
0308172 3/1989 European Pat. Off. .
0310114 4/1989 European Pat. Off. .
0394975 10/1990 European Pat. Off. .
192952 4/1989 Japan .
2200239 7/1988 United Kingdom .
2211980 7/1989 United Kingdom .

*Primary Examiner*—Robert S. Tupper
*Attorney, Agent, or Firm*—Stevens, Davis, Miller & Mosher

[57] ABSTRACT

A magnetic recording/reproducing apparatus according to the present invention is constituted by a chassis on which a rotary head cylinder and a reel frame are provided; a cassette carrier for holding a tape cassette; and cassette carrier moving means for relatively moving/guiding the rotary head cylinder into the tape cassette in a state where the tape cassette is not engaged to the reel frame. The tape cassette and the reel frame are engaged to each other after the rotary head cylinder has been relatively moved/guided into the tape cassette. As a result, the depth of the apparatus can be reduced and as well as the thickness can also be reduced.

1 Claim, 10 Drawing Sheets

CASSETTE LOADING DEVICE FOR A MAGNETIC RECORDING/REPRODUCING APPARATUS

BACKGROUND OF THE INVENTION

1. Field of the Invention

The present invention relates to a magnetic recording/reproducing apparatus which uses a rotary magnetic head cylinder.

2. Description of the Prior Art

Recently, a significant technological innovation has been made in a video-movies which is constituted by integrating a camera and a VTR. In addition, there has been a desire to reduce the size and weight of such apparatus.

Regarding the structure of a VTR product where the size and the weight can be reduced, there has been disclosed "CASSETTE LOADING DEVICE" in Japanese Patent Unexamined Publication No. 1-92952 (Laid-Open data: Apr. 12, 1989; Inventor: Yoshizo Kodama).

A cassette holder into which a tape cassette (hereinafter simply called a "cassette") is loaded is rotatably supported by a reel chassis on which a supply reel frame and a winding reel frame are disposed.

On the other hand, a rotary head cylinder (hereinafter simply called a "rotary head") is disposed on a main chassis. When the cassette is moved downward and the reels of the cassette are respectively engaged to the supply reel and the winding reel, the reel chassis is slid by a drive motor in a direction so that it approaches the rotary head. Therefore, the rotary head is introduced into the cassette. As a result, the required depth of the device can be lessened by virtue of the above-described mechanical effect. Therefore, the overall size of the magnetic recording/reproducing apparatus can be reduced.

However, although the depth of the conventional mechanism can be reduced because the cassette approaches the rotary head, two chassises, that is, the main chassis and the reel chassis must be provided. Furthermore, the outer portion of the magnetic recording/reproducing apparatus is undesirably moved in synchronization with the movement of the reel chassis. Therefore, the overall cost cannot be reduced due to the above-described two factors. In addition, a safety means to act in a case where a user stops the movement of the outer portion must be provided, causing the overall cost to be raised.

OBJECT AND SUMMARY OF THE INVENTION

An object of the present invention is to provide a magnetic recording/reproducing apparatus in which a rotary head and a reel frame are disposed on one chassis, which exhibits similar function to that obtainable from a conventional structure wherein two chassises are slid, so that the size of the apparatus can be reduced.

In order to achieve the above-described object, according to one aspect of the present invention, there is provided a magnetic recording/reproducing apparatus comprising: a chassis on which a rotary head cylinder and a reel frame are placed; a cassette carrier for holding a tape cassette; cassette carrier moving means for relatively moving/guiding the rotary head cylinder into the tape cassette in a state where the tape cassette is not engaged to the reel frame; tape extracting means for drawing a tape in the tape cassette; and tape extracting member moving means for causing the tape extracting means to approach the rotary head cylinder in synchronization with the movement of the cassette carrier.

According to the present invention, the cassette carrier can be moved until the rotary head is introduced into the cassette in a state where the cassette is not fastened to the reel frame. Therefore, the rotary head and the reel frame can be disposed coming closer to each other on one chassis in comparison with the conventional structure. Therefore, the mechanism can further be reduced. In addition, since the tape extracting means is moved synchronously, the distance of the introduction of the rotary head into the cassette can further be elongated. Therefore, the rotary head and the reel frame can be disposed on one chassis further adjacent to each other. Consequently, the overall size can be further reduced.

Other and further objects, features and advantages of the invention will be appear more fully from the following description.

DETAILED DESCRIPTION

An embodiment of the present invention will now be described with reference to the drawings.

(1) First, a cassette holder mechanism will now be described.

Figure 1:
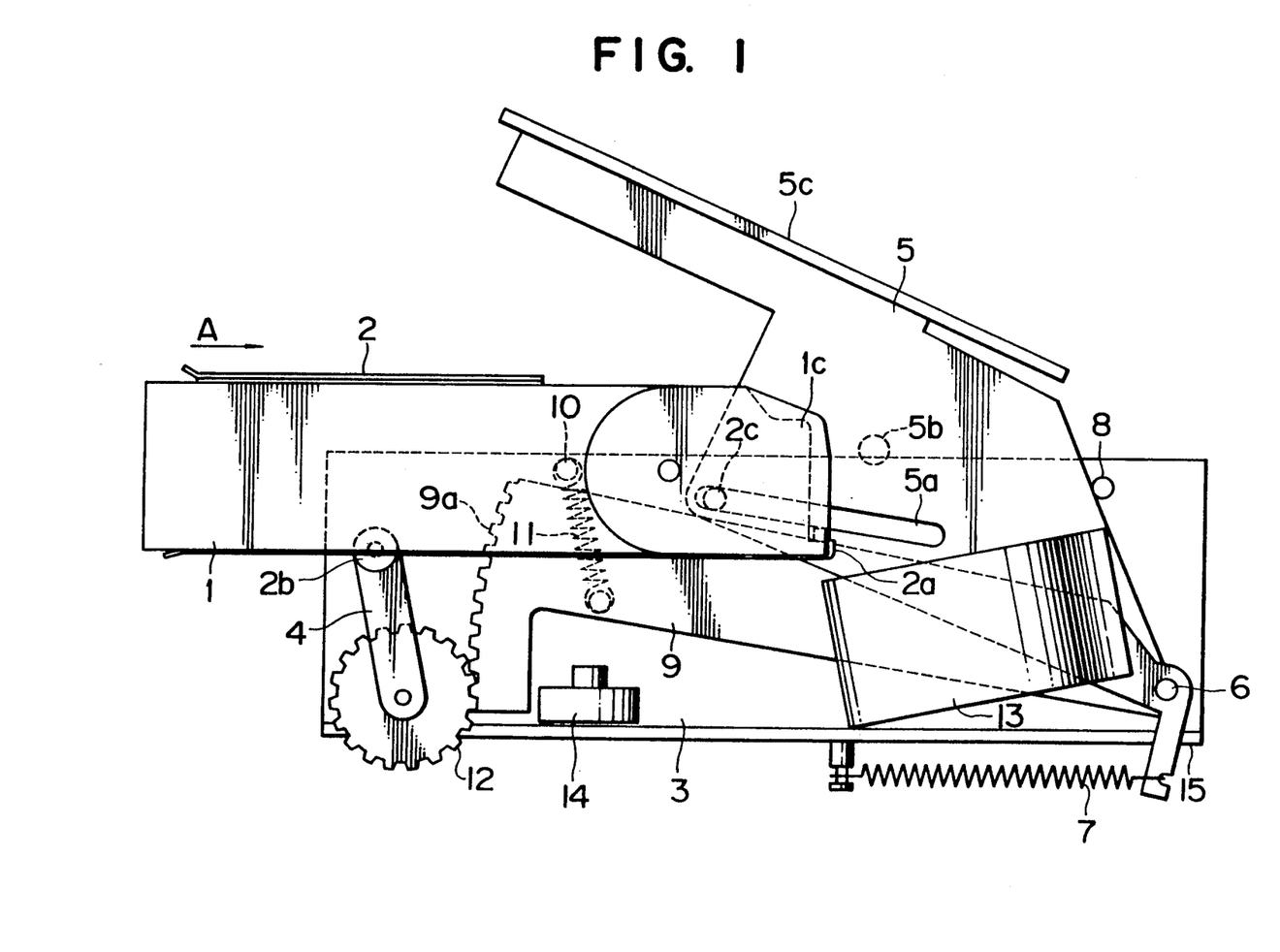
FIG. 1 is a side elevational view which illustrates a cassette holder in a state where insertion of a cassette is commenced.
Figure 2:
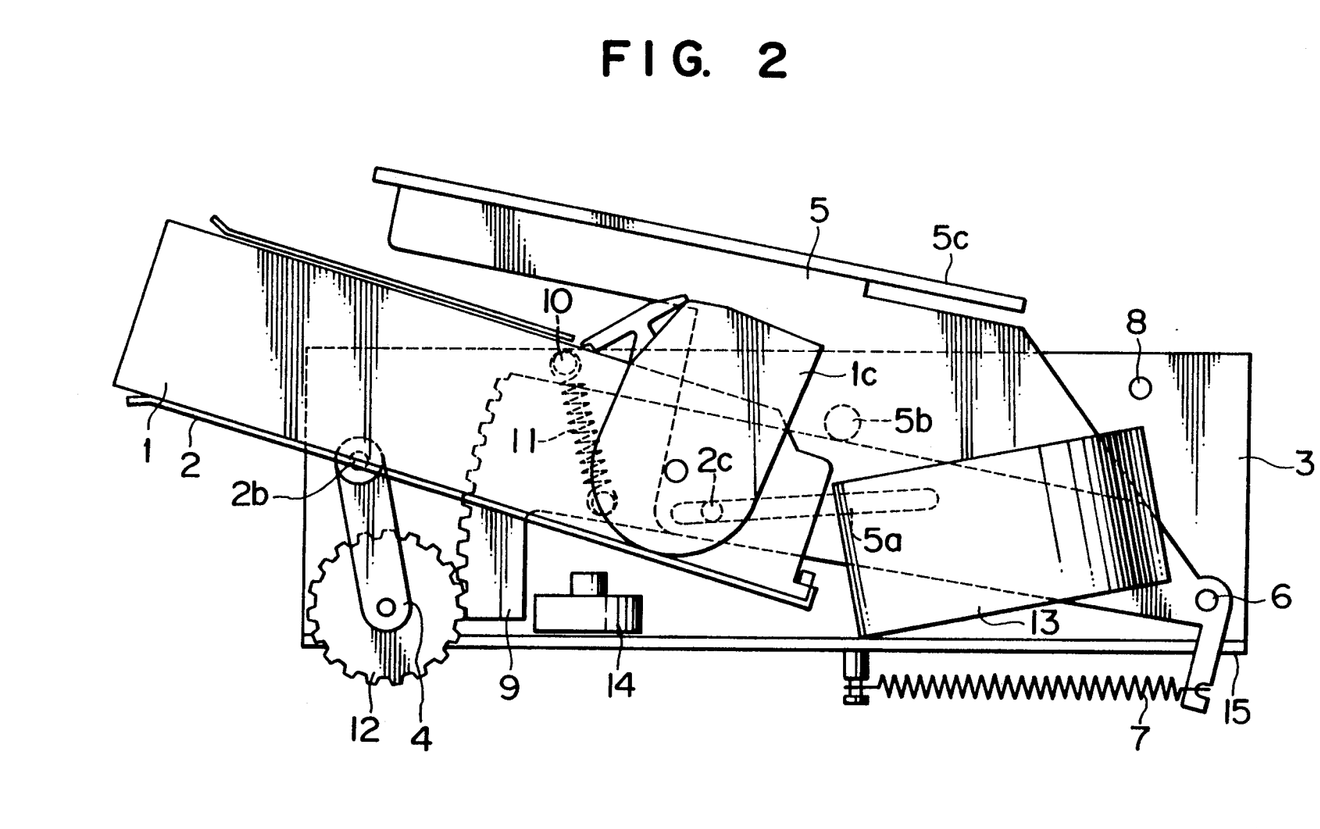
FIG. 2 is a side elevational view which illustrates the cassette holder in a state where the cassette is being inserted.
Figure 3:
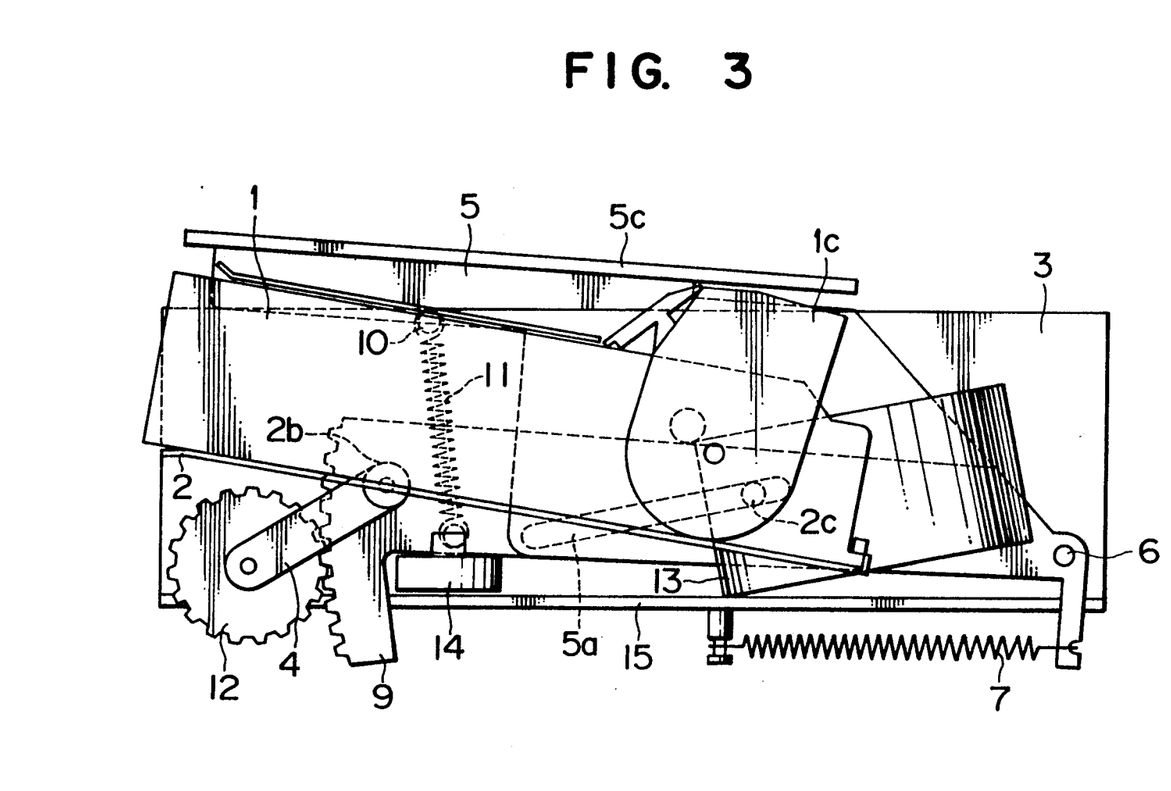
FIG. 3 is a side elevational view which illustrates the cassette holder in a state where the cassette is being inserted.
Figure 4:
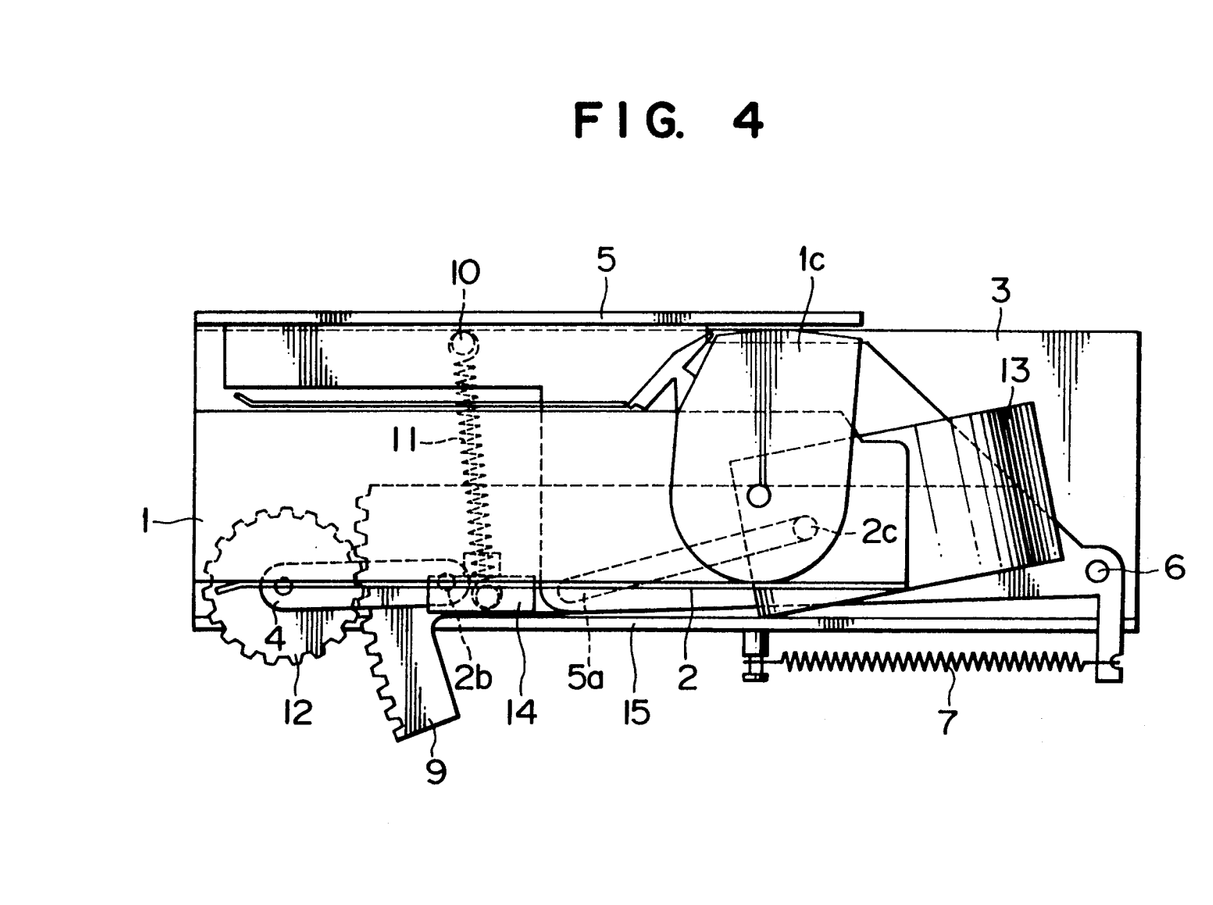
FIG. 4 is a side elevational view which illustrates the cassette holder in a state where cassette loading has been completed.
Figure 5:
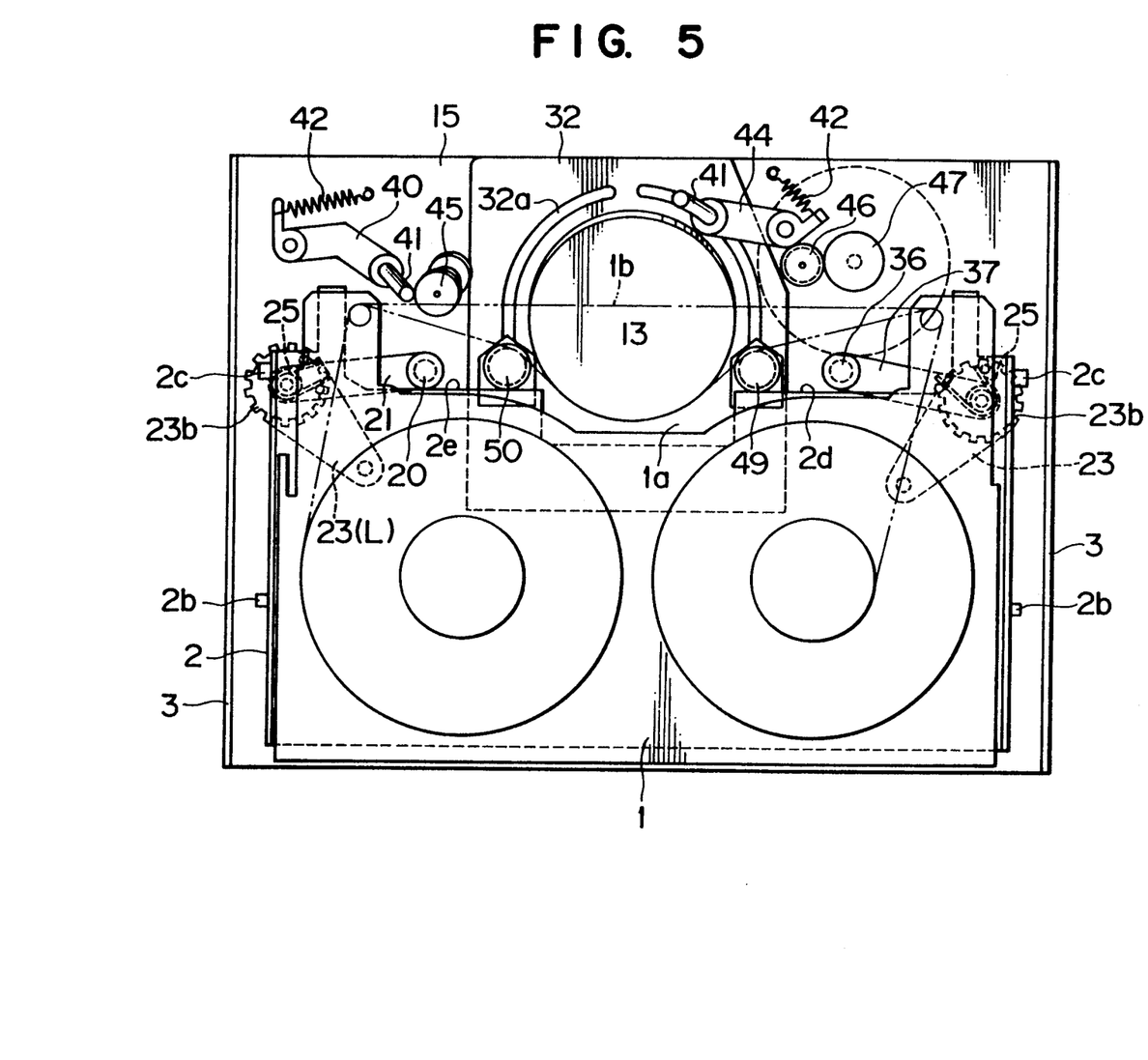
FIG. 5 is a plan view which illustrates a magnetic recording/reproducing apparatus in a state corresponding to FIG. 3.

FIGS. 1 to 4 are respectively side elevational views which illustrate a cassette holder which is an essential portion of the embodiment of the present invention. FIG. 1 illustrates a state where the insertion of a cassette is commenced and FIG. 4 illustrates a state where the cassette has been loaded. FIGS. 2 and 3 sequentially illustrate the process from the insertion of the cassette to the completion of the loading. FIG. 5 is a plan view which corresponds to the status shown in FIG. 3.

Referring to FIG. 1, a cassette 1 is inserted in a direction designated by an arrow A until its front portion comes in contact with a stopper 2a of a cassette carrier 2. As a result, the cassette 1 is set at a predetermined position. The cassette carrier 2 has supporting pins 2b and 2c respectively positioned in the lower portion of the rear section thereof and the central portion of the forward section thereof. The supporting pin 2b is supported at an end portion of a holder arm 4, while the supporting pin 2c is inserted in and guided along an elongated hole portion 5a formed in a top plate 5 after it has been slid. The top plate 5 is pivotally supported by a rotary pin 6 fastened to a side plate 3 of the body of the cassette holder. Furthermore, the top plate 5 is urged clockwise by a holder spring 7 so that the top plate 5 comes in contact with a stopper pin 8 on the side plate 3 of the body of the cassette holder. As a result, the outer holder 5 is positioned as shown in FIG. 1.

Furthermore, a drive arm 9 is pivotally supported by the rotary pin 6 similarly to the top plate 5. Also the drive arm 9 is urged by an arm spring 11 which is secured at an end portion to a spring pin 10 of the side plate 3 of the body. As a result, an end portion of the drive arm 9 comes in contact with the spring pin 10 so that the drive arm is positioned as shown in FIG. 1. A geared portion 9a formed in the front section of the drive arm 9 is engaged to an arm gear 12 carried by the holder arm 4. Reference numeral 13 represents a rotary head cylinder and 14 represents a reel table, the rotary head cylinder 13 and the reel table 14 being mounted on a main chassis 15. It is noted that the holder arm 4 and the drive arm 9 are respectively arranged on each side of the cassette holder, symmetrically.

(2) Tape drawing means and moving means for moving a tape extracting member will now be described.

Figure 6:
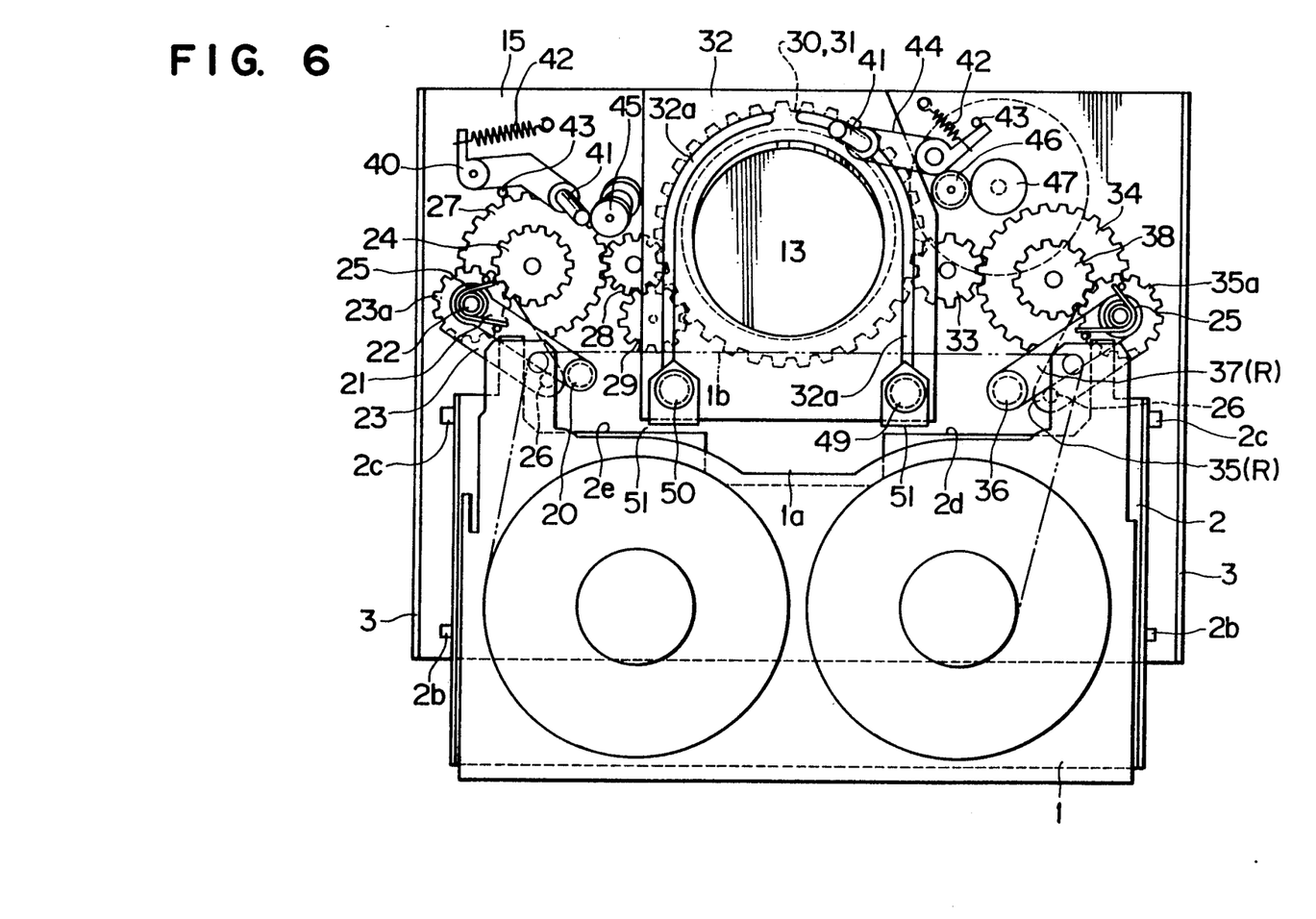
FIG. 6 is a plan view which illustrates a magnetic recording/reproducing apparatus in a state corresponding to FIG. 2.
Figure 7:
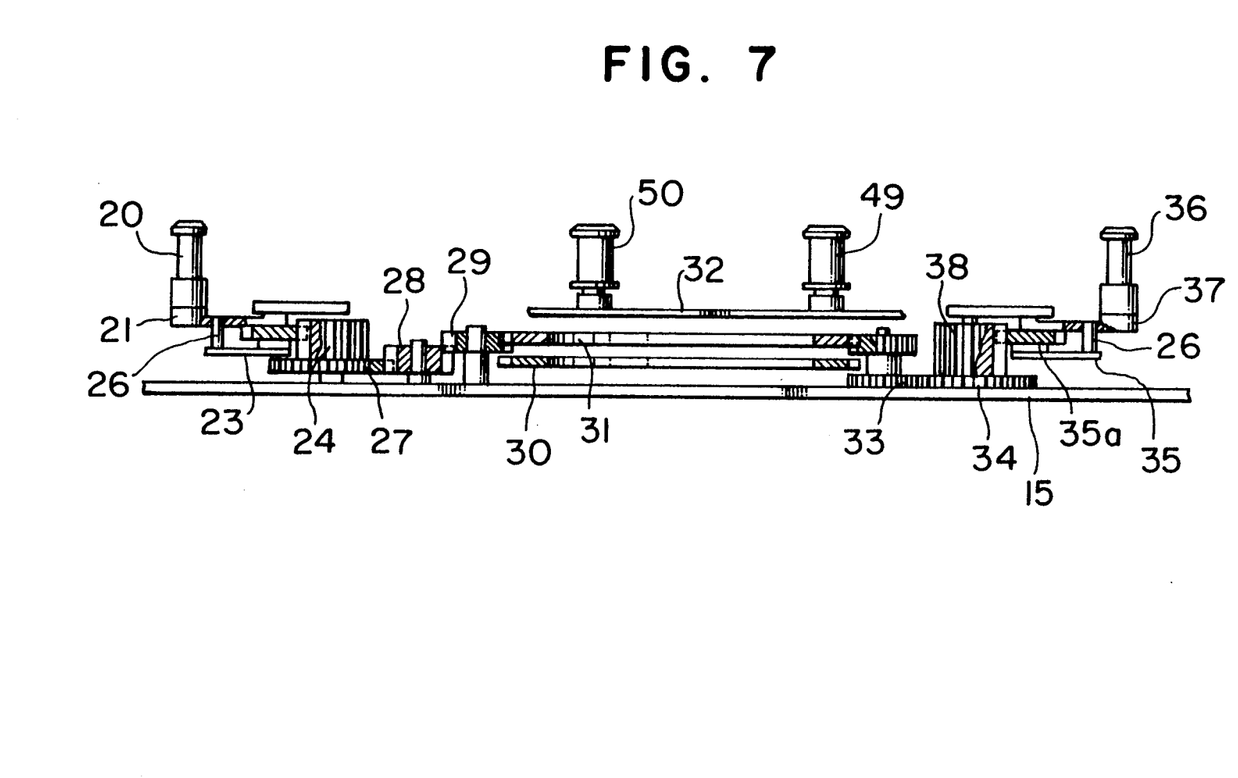
FIG. 7 is a side elevational view which illustrates tape extracting member moving means.

FIG. 6 is a plan view which illustrates the cassette holder into which the tape extracting member has been inserted the cassette holder being set at the position as shown in FIG. 2. FIG. 7 is a side elevational view which illustrates the moving means for moving the tape extracting member.

Referring to FIGS. 6 and 7, a first post 20 is pivotally supported on a left post arm 21. Furthermore, a left drive arm 23 is pivotally supported by a support shaft 22 of the first post 20. The left drive arm 23 has a gear portion 23a which is engaged to a relay gear 24. An unload spring 25 is laid between the left drive arm 23 and the left post arm 21 so as to urge in a clockwise direction the left post arm 21 with respect to the left drive arm 23. However, an end portion of the left post arm 21 is positioned in contact with an engaging pin 26 of the left drive arm 23. As a result, the positional relationship as shown in FIG. 6 is obtained between the left drive arm 23 and the left post arm 21. A second relay gear 27 integrally incorporated with the first relay gear 24, a third relay gear 28 and a fourth relay gear 29, are engaged to each other. The third relay gear 28 is engaged to a first loading ring gear 30 while the fourth relay gear 29 is engaged to a second loading ring gear 31. The first loading ring gear 30 and the second loading ring gear 31 are arranged to be in the form of a doublering structure disposed between a guide plate 32 and the main chassis 15 in such a manner that they rotate in opposite directions. The second loading ring gear 31 is engaged to a fifth relay gear 33, the second loading ring gear 31 transmits the driving force to a gear portion 35a of a right drive arm 35 via a sixth relay gear 34 and a seventh relay gear 38. Since the right drive arm 35 and a portion of the right post arm 37 including a second post portion 36 are constituted substantially similarly to the above-described portion including the first post 20, the descriptions regarding the elements given the same reference numerals are omitted here. However, since the right post arm 37 and the left post arm 21 rotate in opposite directions, the urging from the arm load spring 25 is made counterclockwise.

Reference numeral 40 represents a left inclined-post arm for supporting an inclined post 41, the left inclined-post arm 40 being urged clockwise by a coil spring 42 and positioned as shown in FIG. 6 by the stopping action of the stopper pin 43. Also a right inclined-post arm 44 is arranged similarly, the right inclined-post arm 44 being counterclockwise urged by the coil spring 42. Reference numerals 45 and 46 represent rotary posts planted on the main chassis 15. Reference numeral 47 represents a capstan holder.

(3) The structure of each of the first and second loading ring gears 30 and 31, the third post 49 and the fourth post 50 will now be described.

Figure 8:
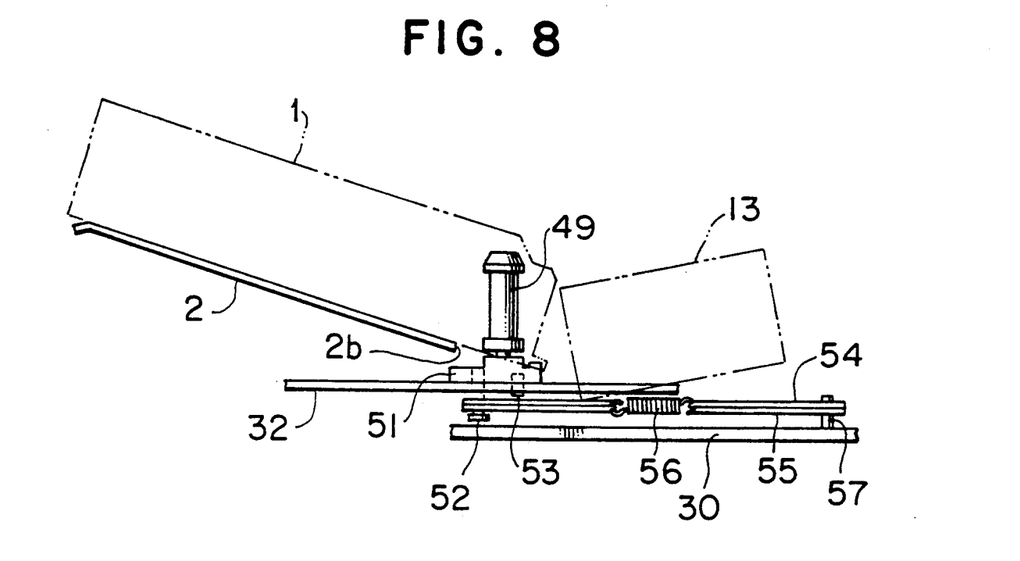
FIG. 8 is a side elevational view which illustrates a post moving means in a state corresponding to FIG. 2.
Figure 9:
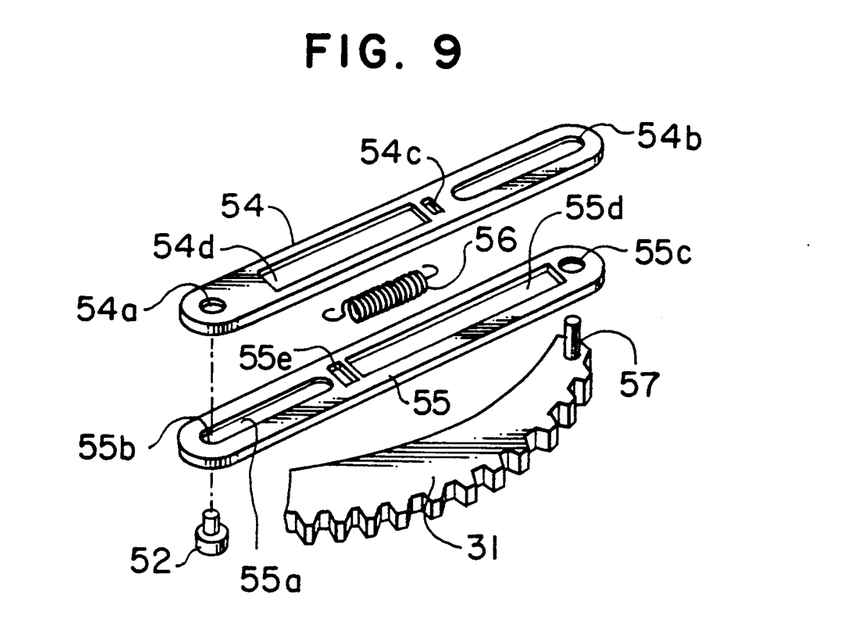
FIG. 9 is an exploded perspective view which illustrates the post moving means.

FIG. 8 is a side elevational view which illustrates a moving means for moving the third post in a state shown in FIG. 2. FIG. 9 is an exploded perspective view of FIG. 8. A carriage for supporting a third post 49 having guide pins 52 and 53 inserted into guide grooves formed in a guide plate 32. The guide pin penetrates a first guide lever 54 and a second guide lever 55. Correspondingly, an engaging hole 54a is formed in the first guide lever 54, while an elongated hole 55a is formed in the guide lever B55. Since a loading spring 56 is stretched between the first guide lever 54 and the second guide lever 55, they are maintained as shown in FIG. 8 where tho guide pin 52 is positioned in contact with an end portion 55b of the elongated hole 55a formed in the second guide lever 55. A drive pin 57 fastened to the second loading ring gear 31 penetrates a engaging hole 55c formed in the second guide lever 55 and an elongated hole 54b formed in the first guide lever 54. Rectangular holes 54c, 54d, 55d and 55e formed in the first guide lever 54 and the second guide lever 55 are cut portions for accommodating the loading spring 56 and for hooking the two end hooks of the same. As a result, the third post 49 is coupled to the loading ring gear 31 by the clockwise urging force of tho loading spring 56. Similarly, the fourth post 50 is coupled to the first loading ring gear 30 by the counterclockwise urging force. The specific structure of each of the fourth post 50 and the second, loading ring gear 30 is omitted here.

Figure 10:
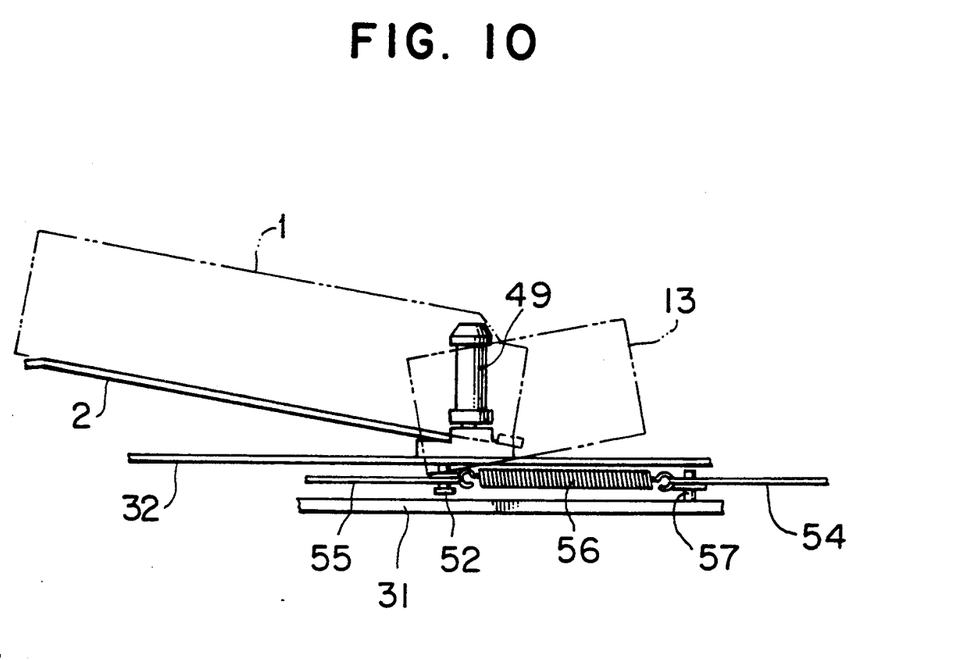
FIG. 10 is a side elevational view which illustrates the post moving means in a state which corresponds to FIG. 3.

The operation of the magnetic recording/reproducing apparatus thus-constituted will now be described. First, the operation of the cassette holder mechanism will be described with reference to FIG. 1. The cassette 1 is inserted into the cassette carrier 2 until its front portion comes in contact with the stopper 2a of the cassette carrier 2. Then, a top panel portion 5c is depressed so as to push down and counterclockwise rotate the top plate 5 around the rotary pin 6 against the urging force of the holder spring 7. At this time, the drive arm 9 is maintained in a state where it is positioned in contact with the spring pin 10 until the engaging pin 5b of the top plate 5 comes in contact with the end portion of the drive arm 9. Therefore, the holder arm 9 is not rotated. That is, the position of the supporting pin 2b among two pins of the cassette carrier 2 is not changed. The other supporting pin 2c is slidably guided by the elongated hole portion 5a formed in the top plate 5. Therefore, the supporting pin 2c is moved downward when the top plate 5 is moved downward. As a result, the cassette 1 is, as shown in FIG. 2, rotated clockwise around the supporting pin 2b. Therefore, a state as shown in the plan view of FIG. 6 is realized. Referring to FIG. 6, a tape 1b stretched along the front surface of the cassette 1 is released and exposed to outside since a front cover 1c (see FIG. 2) of the cassette 1 is rotated. Then, it is inserted into a portion between the rotary head cylinder 13, the first post 20, the second post 36, the third post 49 and the fourth post 50. Each of the above-described posts is positioned in an opening portion 1a of the cassette 1. Since the operation of opening the front cover 1c of the cassette 1 can be carried out by a known method, its description is omitted here. Then, the tape extracting means is inserted into the opening portion of the cassette 1 in a state shown in FIG. 1 in which the cassette 1 can be inserted. When states shown in FIGS. 2 and 6 are realized, the engaging pin 5b of the top plate 5 comes in contact with the end portion of the drive arm 9. Therefore, when the top plate 5 is further depressed, the drive arm 9 rotates counterclockwise together with the top plate 5 against the urging force of the arm spring 11. As a result, the holder arm 4 rotates clockwise together with the arm gear 12 so that the cassette carrier 2 is caused to approach the rotary head cylinder 13. On the other hand, the supporting pin 2c is moved downward following the downward movement of the top plate 5. However, since the elongated hole portion 5a of the top plate 5 has a groove in a slightly-upward direction thereof, the tape 1b arranged in front of the cassette 1 approaches the rotary head cylinder 13 while maintaining a substantially uniform height. Then, the positional relationship as shown in FIG. 3 is realized and a state shown in the plan view of FIG. 5 is realized. When the cassette carrier 2 comes to the rotary head cylinder 13, front portions 2d and 2e of the bottom surfaces of the cassette carrier 2 respectively come, in contact with the end portions of the left post arm 21 of the first post 20, the right post arm 37 of the second post 36, the third post 49 and the board 51 of the fourth post 50. Then, the cassette carrier 2 approaches the rotary head cylinder 13 while pressing the above-described end portions. As a result, substantially half of the rotary head cylinder 13 is inserted into the opening portion 1a of the cassette 1. When the left post arm 21 is pressed by the cassette carrier 2, only the left post arm 21 is, leaving the left drive arm 23, rotated counterclockwise against the urging force of the unload spring 25. Similarly, the right post arm 37 is rotated clockwise against the unload spring 25. On the other hand, the third post 49 is changed from the state shown in FIG. 8 to that shown in FIG. 10. When the cassette carrier 2 presses the carriage 51 of the fourth post 49, the carriage 51 is moved forward along a guide groove 32a formed in the guide plate 32. As a result, only the guide lever 54 is, leaving the guide lever 55, moved against the loading spring 56, causing a state shown in FIG. 10 to be realized. The fourth post 50 acts similarly. When the top plate 5 is further depressed from the state shown in FIG. 3, the drive arm 9 further causes the holder arm 4 to rotate clockwise the arm gear 12. Therefore, the cassette carrier 2 is moved downward while moving forward by a short distance. Since the supporting pin 2c is not substantially moved with respect to the elongated hole portion 5a, the height of the front portion of the cassette 1 is not substantially changed. However, only the rear portion of the same is rapidly moved downward in association with the downward movement of the supporting pin 2b. As a result, as shown in FIG. 4, the reel of the cassette 1 is engaged to the reel table 14 on the main chassis 15. Furthermore, the bottom surface of the cassette 1 is placed to a right position by a locating pin (omitted from illustration) on the main chassis 15 with respect to the rotary head cylinder 13. In this state, the top plate 5 is locked by a locking mechanism (omitted from illustration) formed on the side plate 3 of the body of the cassette holder. Thus, the operation of loading the cassette by means of the cassette holder is completed. That is, the operation of the cassette holder is performed as follows: only the front portion of the cassette 1 is moved downward from the position at which the cassette 1 is inserted until it reaches the position at which the above-described various posts can be inserted into the opening portion 1a of the cassette 1. Then the cassette 1 approaches the rotary head 13 before the rear portion of the cassette 1 is downward moved so that the reel and the reel table are engaged with each other.

Figure 11:
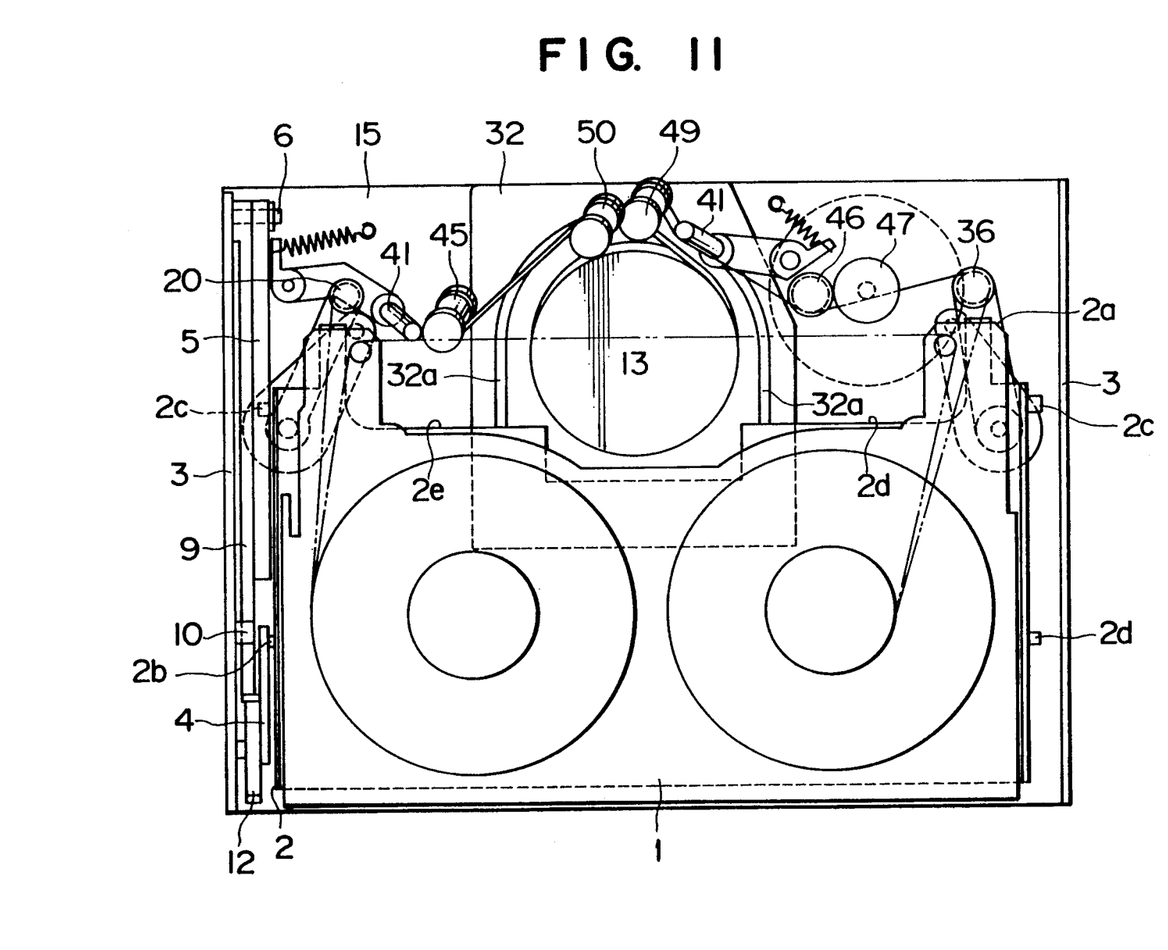
FIG. 11 is a plan view which illustrates the magnetic recording/reproducing apparatus in a state where the tape loading has been completed.

The operation of the moving means for moving the tape extracting member will now be described. FIG. 11 is a plan view which illustrates a state where the tape loading operation has been completed. Although the first post 20, the second post 36, the third post 49 and the fourth post 50 are respectively moved by the cassette carrier 2 overcoming the coil springs to a state shown in FIG. 5, the cassette 1 is not changed from the state shown in FIG. 5 when viewed in a plan view if it has been changed in its position from that shown in FIG. 3 to that shown in FIG. 4. An assumption is made that the state shown in FIG. 5 is the state where operation of loading the cassette 1 by means of the cassette holder has been completed. In this condition, the sixth relay gear 34 shown in FIG. 6 is rotated by a loading motor (omitted from illustration). When the cassette 1 has been loaded onto the reel frame 14, power is supplied to the loading motor so that the above-described sixth relay gear 34 is rotated in a counterclockwise direction. As a result, the right drive arm 35 commences it clockwise rotation, causing the engaging pin 26 to be engaged to the right post arm 37. Therefore, it is rotated clockwise together with the right post arm 37. The second loading ring gear 31 is rotated counterclockwise. Therefore, the position of the third post 49 as shown in FIG. 5 is maintained until the end portion 55b of the elongated hole 55 of the second guide lever 55 comes in contact with the guide pin 52. Then, the rotational force of the third loading ring gear 31 is transmitted to the carriage 51 via the second guide lever 55 and the guide pin 52 so that they are simultaneously moved along the guide groove 32a of the guide plate 32. The first loading ring gear 30 is rotated clockwise so that the fourth post 50 is then moved along the guide groove 32a in the guide plate 32. Similarly to the second post 36, the first post 20 is rotated counterclockwise. When the four posts have been moved to a state as shown in FIG. 11, the loading motor is stopped. As a result, a tape path formed by winding the tape around the rotary head by a predetermined angle can be formed. The first post 20 and the third post 49 cause the inclined post 41 to be retracted from the loading path, overcoming the spring during the post loading operation. When the loading has been completed, the inclined posts 41 are returned to the original positions so that the predetermined tape path is formed.

Since the unloading operation is performed in a reversed manner to the operation described above, its detail description is omitted here. Schematically, it is performed in such a manner that, first power is supplied to the loading motor and the first and the second posts 20, 36 and the third and the fourth posts 49 and 50 are respectively accommodated in the opening portion 1a of the cassette 1. The right and the left drive arms 23 and 35 and the first and the second loading ring gears 30 and 31 are further moved in the unloading direction by the loading motor after the portion of the arms and the carriage of each of the posts have come in contact with the front portions 2d and 2e of the cassette carrier 2 of the cassette holder and the movement has been thereby stopped. Then, their movements are stopped in a state shown in FIG. 5. Then, the locking mechanism for locking the top plate 5 is released, causing the cassette to be separated from the rotary head cylinder 13 before it is retracted to a state shown in FIG. 6. Therefore, the first post 20, the second post 36, the third post 49 and the fourth post 50 are respectively moved to the positions shown in FIG. 6 by their springs. Then, the cassette 1 is moved from the position shown in FIG. 2 to that shown in FIG. 1 before the movement of it is stopped. In this state, the cassette 1 can be ejected from the cassette carrier 2.

As described above, according to the present invention, the cassette approaches the rotary head cylinder after the tape extracting means has been inserted into the cassette. Then, it is engaged to the reel table. Therefore, the rotary head cylinder and cassette fall in a state where the rotary head cylinder has been introduced into the cassette, that is, the reel table and the rotary head cylinder fall in a state where they are positioned adjacent to each other, secured to a single chassis. As a result, the following effect can be obtained in comparison with the conventional mechanism in which two chassis are used;

(1) Since the chassis is arranged in a single unit body, precise positional relationship can be realized.

(2) Since the single unit body is employed, the overall thickness can be reduced and the mechanism for moving the chassis can be eliminated from the structure, causing the overall cost to be reduced.

(3) Since tho positional relationship between the capstan motor and the reel frame can be fixed, the tape drive mechanism can be simplified. In particular, the excessively complicated mechanism necessary to meet the conventional desire of the type in which the tape winding operation during the unloading must be performed during the movement of the reel frame can be eliminated.

(4) Since no movable external elements are used, the layout of the apparatus can be freely determined. In addition, the safety means to protect the user necessary in the prior art can be eliminated from the structure.

Furthermore, according to the present invention, the extraction member is moved in synchronization with the cassette loading operation. Therefore, the moving stroke in which the cassette approaches the rotary head cylinder after the tape extracting member has been inserted into the cassette can be enlarged regardless of the position of the tape drawing member. Therefore, the cassette is able to significantly approach the rotary head cylinder, enabling the further size reduction. In addition, the posts are moved in synchronization with the loading of the cassette, the distance of movement by means of the loading motor can be shortened, causing the loading time to be shortened. Furthermore, the power of the loading motor can be reduced, allowing a further small motor to be employed in the structure.

Although the preferred embodiment of the invention has been described, it is understood that the present invention should not be limited to this preferred form, but various changes and modifications can be made thereto without departing from the spirit and the scope of the invention as hereinafter claimed.

We claim:

1. A cassette loading device for a magnetic recording/reproducing apparatus, comprising:

a chassis;

a rotary head cylinder and a reel drive means mounted to said chassis;

cassette carrier means, movable relative to said chassis, for moving a tape cassette from a cassette insertion position to a recording/reproducing position;

tape extracting means for extracting a tape from said tape cassette;

a tape cassette driving means for driving said tape cassette;

cassette carrier moving means for moving said cassette carrier means so that said tape cassette is moved from said cassette insertion position to said recording/reproducing position and leading said tape cassette so as to introduce said rotary head cylinder within said tape cassette, said rotary head cylinder being received in said tape cassette at said recording/reproducing position, and said tape cassette being engaged with said cassette drive means; and means for moving said tape extracting means and causing said tape extracting means to approach said rotary head cylinder in response to movement of said cassette carrier means so that said tape extracting means winds said tape from said tape cassette around said rotary head cylinder.

* * * * *